United States Patent [19]

Brady et al.

[11] 4,283,501

[45] Aug. 11, 1981

[54] FIRE-RETARDANT COMPOSITION CONTAINING DERIVATIVES OF POLYPHOSPHORIC ACID PARTIAL ESTERS

[75] Inventors: Thomas P. Brady, Holliston; Horst G. Langer, Wayland, both of Mass.

[73] Assignee: The Dow Chemical Company, Midland, Mich.

[21] Appl. No.: 116,120

[22] Filed: Jan. 28, 1980

[51] Int. Cl.$^3$ .................. C08K 5/52; D06M 13/26; B32B 13/10

[52] U.S. Cl. .................................... 525/2; 8/116 P; 106/18.14; 106/18.15; 106/18.18; 106/18.19; 106/177; 252/607; 260/DIG. 24; 428/276; 428/921

[58] Field of Search .................... 8/116 P; 525/2; 106/18.14, 18.15, 18.18, 18.19, 177, 15.05; 252/8.1; 260/980, 944, 945, 926, DIG. 24; 428/276, 921

[56] References Cited

U.S. PATENT DOCUMENTS

| | | | |
|---|---|---|---|
| 3,650,820 | 3/1972 | DiPietro et al. | 106/18.18 |
| 3,660,582 | 5/1972 | DiPietro et al. | 106/18.18 |
| 3,700,403 | 10/1972 | Nachbur et al. | 106/18.18 |
| 3,772,068 | 11/1973 | Hoffman et al. | 106/18.18 |
| 4,054,720 | 10/1977 | Tomita et al. | 106/18.18 |
| 4,062,687 | 12/1977 | Mauric et al. | 106/18.18 |
| 4,076,630 | 2/1978 | Smith | 106/18.18 |
| 4,148,782 | 4/1979 | Mauric et al. | 106/15.05 |
| 4,154,691 | 5/1979 | Mauric et al. | 106/15.05 |
| 4,210,452 | 7/1980 | Nicholson et al. | 106/18.18 |

*Primary Examiner*—John Kight, III
*Attorney, Agent, or Firm*—Douglas N. Deline

[57] ABSTRACT

Cellulosic substrates, e.g., wood, textiles, or paper, have increased fire resistance when there are added thereto one or more compounds of the formula

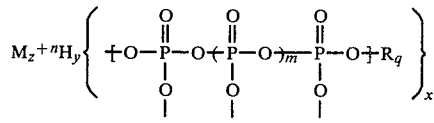

wherein M and R are specified substituents.

22 Claims, No Drawings

FIRE-RETARDANT COMPOSITION CONTAINING DERIVATIVES OF POLYPHOSPHORIC ACID PARTIAL ESTERS

BACKGROUND OF THE INVENTION

Numerous monophosphate derivatives are known to be effective fire-retarding agents. In general, however, polyphosphoric acid derivatives have not been used as fire-retarding agents. In particular partial esters of polyphosphoric acid have not been suitable because of the presence of residual acid functionality which is likely to adversely affect cellulosic materials with which it is brought into contact.

Furthermore, monophosphate derivative fire-retarding agents are generally regarded as nonpermanent. Such fire-retarding agents are susceptible to leaching from the cellulosic material upon contact with water. Cellulosic materials so exposed are thereby rendered less resistant to fire. In U.S. Pat. No. 3,565,679 a list of non-permanent fire retardants includes the phosphates.

SUMMARY OF THE INVENTION

According to the invention cellulosic materials that are resistant to fire are provided by incorporating therein fire-retarding amounts of a compound of the formula

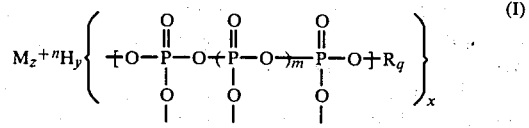

wherein,

R is each occurrence the remnant of phenol, halophenol or a $C_{1-20}$ aliphatic or halogenated aliphatic monohydroxyl compound formed by removal of the hydroxyl group;

M is independently each occurrence an ammonium, substituted ammonium or metal cation having valance n;

m is an integer from zero to three; y is an integer equal to or greater than zero; and q, x and z are all integers greater than or equal to one selected such that $(zn)+y=x(m+4)-q$ and $q \leq m+3$.

Preferred are cellulosic compositions containing a fire-retarding amount of water-insoluble compound of the identified formula, for example aluminum-containing derivatives of polyphosphoric acid partial esters. It has been found that such compositions retain fire-resistant qualities even after exposure to water.

DETAILED DESCRIPTION OF THE INVENTION

The invention comprises a method of treating cellulosic materials to render them resistant to fire. Included in the invention are such treated cellulosic materials that have been rendered resistant to burning by fire. By cellulosic material is included wood, paper, cardboard and other wood products such as chip board, plywood, cellulose insulation, etc. and fabrics comprised entirely or partially of cellulosic fibers. Examples are cotton, linen, and blends thereof with various synthetic fibers.

Accordingly, the above-described materials are treated by any convenient method so as to add to them fire-retarding amounts of the compounds of formula I.

Such compounds are ammonium or metal-containing derivatives of partial esters of polyphosphoric acids.

By "ammonium" is meant not only the monovalent cationic derivative of ammonia formed by addition of a hydrogen ion thereto, but also $C_{1-20}$ aliphatic and aromatic amine derivatives formed in a similar manner by addition of a hydrogen ion to the respective amine compounds. Included are primary, secondary and tertiary amines.

The metal employed, if any, is not critical and such may be selected from alkali metal and alkaline earth metal elements, the transition elements and the elements of group 3a of the periodic table. Preferred are metals selected from K, Mg, Al, Na, Ca, Ti, Cr, Mn, Fe, Co, Ni, Cu, Zn and Ag. Especially preferred are Al, K or Na. The electronic state of the metal species is not fully understood and the compounds in many ways exhibit the qualities of coordination complexes.

The compounds may be formed by reaction of certain hereinafter-described partial esters of polyphosphoric acids with ammonia or amine compounds, and with ammonium or substituted ammonium hydroxides, halides, carbonates or oxides as well as with the above-described neutral metals or their corresponding metal oxides, carbonates, hydroxides, halides, sulfates or nitrates. Mixtures of reactants and successive reactions of the partial esters with combinations of the above reactants, e.g., first reaction with a metal salt followed by neutralization of remaining acid functionality with ammonia or amine compounds may be employed.

The preferred compounds are those that are substantially water-insoluble. Cellulosic materials containing added quantities of such compounds have been found to retain their fire resistance even after exposure to water for extended periods of time. As an example of such a preferred compound are the aluminum-containing derivatives.

The partial esters of polyphosphoric acids useful in forming the compounds of the present invention are of the formula

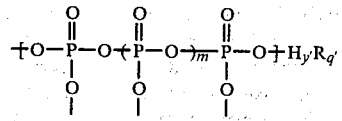

wherein R and m are as previously defined; and y' and q' are integers greater than or equal to one such that $y'=(m+4)-q'$.

Suitable monohydroxyl compounds from which R may be formed are phenol, halophenols or common aliphatic alcohols such as alkanols and halogenated derivatives thereof, alkyl or phenyl monoether derivatives of alkanediols and halogenated derivatives thereof and alkyl or phenyl monoether derivatives of (poly)alkylene glycols and halogenated derivatives thereof. The remnant portion after removal of the hydroxyl functionality may be described as being $C_{1-20}$ alkyl, phenyl, alkyl (poly)oxyalkylene, phenyl (poly)oxyalkylene radicals and halogenated derivatives thereof, the term (poly) referring to an optional multiplicity of oxyalkylene units. Preferred halogenated derivatives are bromine-containing derivatives. A mixture of the above suitable remnants of monohydroxyl compounds may also be used.

Most preferred are compounds of the above formula (I) wherein R is of the formula

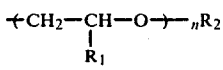

where $R_1$ is each occurrence hydrogen, methyl or halomethyl; $R_2$ is each occurrence $C_{1-6}$ alkyl or haloalkyl, phenyl or halophenyl and n is an integer from 1 to 4.

The partial esters of polyphosphoric acid are formed by the reaction of a stoichiometric deficiency of the above described monohydroxyl compounds with phosphorus pentoxide. The reaction technique is well-known being similar to that disclosed in U.S. Pat. No. 2,866,680. Accordingly, the monohydroxyl reactant is controllably added to a slurry comprising phosphorus pentoxide and an organic solvent such as the lower alkanes, aromatics or halogenated hydrocarbons. A preferred solvent is dichloromethane.

Addition of the monohydroxyl reactant is discontinued at or before the point where the ratio of monohydroxyl to phosphorus (R:P) is about 1:1. To compensate for possible water contamination of the monohydroxyl reactant, excess $P_2O_5$ is preferably utilized, e.g., R:P ratios from 0.9:1 to 1:1, and most preferably from 0.95:1 to 1:1. The ratio of monohydroxyl remnant to phosphorus in the reaction product is desirably about 1:1.

The exothermic reaction causes heating of the reaction mass. Proper choice of a solvent allows the reaction to be maintained at a gentle reflux at moderately elevated temperatures. The reaction may be continued for several hours or longer until the $P_2O_5$ is substantially completely reacted. Additional heating during the course of the reaction may be accomplished by conventional means.

The product, generally a light colored liquid, may be separated from any excess unreacted $P_2O_5$ by decanting or filtration, and the solvent removed if desired by evaporation or other technique.

Reaction of the partial esters of polyphosphoric acid with the previously-described ammonia, amine or metal reactants is accomplished by contacting the two reactants optionally in the presence of an inert solvent which may be the solvent previously used for formation of the partial ester. Elevated temperatures may also be employed to increase the rate of reaction.

The resulting compounds are easily recovered in high purity by evaporation of the reaction solvent. Monophosphate or full ester contaminants are produced only in minor proportions during the reaction and are preferably present in an amount less than 10 percent by weight. Generally a mixture of the compounds is produced.

The metal-containing compounds are believed to exist as coordination complexes having the empirical formulas previously stated. Assignment of more definitive structural formulas to the various compounds cannot be attempted at the present time since the compounds exist as an intricate coordination network which is randomly oriented in three dimensions.

Treatment of cellulosic materials in order to render such materials resistant to fire is accomplished by any suitable means. According to one method the described compounds may be applied as a solution in an organic solvent to the cellulosic material by any suitable means, for example: dipping, painting, spraying, pressure impregnation, etc. The solvent is then removed, as for example by evaporation. The compounds are preferably employed in fire-retarding concentrations from about 1 percent to about 40 percent and most preferably from about 5 percent to about 30 percent by weight based on the dry weight of the cellulosic material.

An alternate method may also be utilized to produce the metal diphosphoric acid ester complexes used in treating cellulosic materials according to this invention. Accordingly, a metal alkoxide is first formed by alkoxide-exchange or by direct reaction of the hydroxyl-bearing compound or a mixture thereof with the metal. The metal alkoxide is then contacted with phosphorus pentoxide in the same manner previously-described to form the desired metal derivatives of polyphosphoric acid partial esters. The process is more fully described in Examples, 4, 5 and 6 which follow hereinafter.

SPECIFIC EMBODIMENTS OF THE INVENTION

The following examples are provided as further illustrative of the present invention and are not to be construed as limiting.

EXAMPLE 1

Preparation of bis(butoxyethyl)diphosphoric acid

Phosphorous pentoxide (270 g, 1.9 moles) was slurried under nitrogen in a reaction flask containing 500 ml $CH_2Cl_2$. Over approximately 2 hours 2-n-butoxyethanol (425 g, 3.6 moles reagent grade) was added from a dropping funnel causing a gentle reflux to occur. After complete addition only a small amount of unreacted $P_2O_5$ remained. The flask contained a clear yellow colored solution. Reaction for an additional 24 hours resulted in complete conversion of $P_2O_5$ and a darker colored solution. Analysis by $^{31}P$ nuclear magnetic resonance specroscopy indicated the product comprised greater than 90 percent of the diphosphoric acid half ester with minor amounts of other partial esters of polyphosphoric acids, plus monophosphates and full ester contaminants.

EXAMPLE 2

A portion of the product produced in Example 1 was neutralized by bubbling dry $NH_3$ into the solution at a rate sufficient to cause a gentle reflux. After about 90 minutes no further exotherm occurred indicating the reaction was complete. The solution was further diluted with $CH_2Cl_2$ to a concentration of 15 percent by weight and used to treat several small strips of fir plywood, $\frac{1}{4}'' \times \frac{1}{2}'' \times 3''$ long. After immersion in the solution for between 2 and 8 hours, the strips were dried at 100° C. for about 4 hours and then humidified at normal room conditions for 2 days. When clamped at a 45° angle and ignited for 15 seconds with a bunsen flame, all the treated strips self-extinguished in an average of less than 20 seconds. By comparison untreated strips subjected to the same procedure are entirely consumed.

EXAMPLE 3

A portion of the solution produced in Example 1 was combined with metallic aluminum so that the ratio of polyphosphoric acid partial ester to aluminum was 3:1. The mixture was gently heated taking care not to exceed 150° C. to avoid decomposition of the diphosphoric acid partial ester. A trace of water or alcohol added to the mixture acted as a catalyst to initiate the dehydrogenation reaction.

After completion of the reaction as evidenced by cessation of gas evolution (approximately ½ hour), a viscous product comprised of coordination polymers of aluminum and diphosphoric acid remained.

Similar experiments utilizing a solvent (toluene) and substituting iron for aluminum have also produced the desired coordination complexes, although their formation generally required longer reaction times.

EXAMPLE 4

Preparation of aluminum complex by alkoxide exchange

Aluminum isopropoxide (20.4 g, 0.1 mole) was added to a solution of butoxyethanol (47.2 g, 0.4 mole) contained in 200 ml of $CH_2Cl_2$. After stirring to thoroughly mix the reactants, the solvent was removed by a Rotovac vacuum stripping apparatus and the remaining solution heated in vacuo over steam until all isopropanol formed during the reaction had volatilized. Remaining in the flask was a white waxy solid weighing 50.5 grams identified as having an empirical formula of $HAl(OC_2H_5OC_4H_9)_4$.

EXAMPLE 5

The product produced in Example 4 (0.1 mole based on aluminum) was dissolved in 200 ml of $CH_2Cl_2$ and slowly added by means of a dropping funnel with stirring to a slurry of $P_2O_5$ (28.5 g, 0.2 mole) in 200 ml $CH_2Cl_2$. The mixture slowly increased in viscosity which $CH_2Cl_2$ refluxed due to the exothermic reaction. After complete addition a clear homogeneous gel was obtained.

EXAMPLE 6

Addition of dry $NH_3$ or an alkanolamine to neutralize the acid-functionality of the complex formed in Example 5 resulted in a low viscosity solution. Treatment of cellulosic materials with the solution may be accomplished in the same manner as Example 2.

EXAMPLE 7

Mixed alkoxide of aluminum

Aluminum tri(2-n-butoxyethoxide) was prepared by incremental addition of pure aluminum turnings to anhydrous 2-n-butoxyethanol. Accordingly, 2-n-butoxyethanol (944 g, 8.0 moles) was added to a 3-liter flask fitted with condenser, stirrer and inlet for dry $N_2$. The flask and contents were heated to reflux temperature (approximately 160° C.) and approximately 5 grams of aluminum turnings were added. Evolution of $H_2$ gas was observed after 2 to 10 hours signifying the reaction had begun.

Once the reaction began additional portions of aluminum turnings were added every 5 to 10 minutes and the temperature of the reaction lowered to about 120° C.-130° C. A total of 63 grams, 2.33 moles of aluminum were reacted in this manner to provide a viscous liquid product.

At this point a different alcohol 2,2,2-tri(bromomethyl)ethanol (432 g, 1.33 moles), dissolved in about 500 ml $CH_2Cl_2$ was added to the neat aluminum alkoxide to produce an equilibrium mixture of aluminum alkoxides in which 2-butoxyethoxy and 2,2,2-tri(bromomethyl)ethoxy radicals were in a 6:1 ratio dissolved in $CH_2Cl_2$.

EXAMPLE 8

Diphosphate half esters of mixed alkoxides

In a 12-liter glass flask equipped with a stirrer, condenser and dry $N_2$ inlet, $P_2O_5$ (700 g, 4.93 moles, 5 mole percent excess) was slurried with 5 liters of $CH_2Cl_2$. The mixed aluminum alkoxide prepared in Example 7 above dissolved in $CH_2Cl_2$ was slowly added with stirring so as to maintain a gentle reflux. Complete addition of aluminum reactant was obtained over a period of 3-4 hours. The final product after all alkoxide reactant was added was saturated with $NH_3$ to break any viscous gels formed and diluted with $CH_2Cl_2$ to a final volume of about 9 liters (approximately 21 percent of the phosphate complex by weight) for treating of wood panels for fire retardancy.

EXAMPLE 9

Preweighed strips of plywood (douglas fir $\frac{1}{4}''\times 3\frac{1}{2}''\times 24''$) were loaded into a treating chamber and the chamber evacuated to a pressure of 1" mercury for 30 minutes. The solution to be used in treating the strips was added to the evacuated chamber and pressure (200 lb/in$^2$) was applied by adding compressed nitrogen.

The pressure was released and the strips removed. Excess surface solution was wiped off. After drying under ambient conditions the strips were heated to 100° C. for several hours and finally rehumidified at 50 percent relative humidity and ambient temperature for several days. By comparing the weights of the strips initially and after the treatment and drying procedure a figure reflecting the percent fire retardant add-on, known as dry add-on percent, was obtained. Different concentrations of treating solutions can be utilized to produce strips having varying amounts of fire-retardant add-on.

EXAMPLE 10

The treating procedure of Example 9 was used to prepare a number of wooden strips. The solutions used had concentrations of the aluminum complex fire retardant of Example 8 of 21 percent, 16 percent and 12 percent, respectively, providing dry add-on percent values (calculated according to the procedure of Example 9) of from 20 to 8 percent.

Seven such strips selected over the range of dry add-on percent values were ignited in a two-foot tunnel designed to simulate the ASTM E-84, 25-foot (Steiner) tunnel test. Accordingly, flame spread is reported in comparison to that obtained on asbestos hardboard and a red oak hardwood standard to which the igniting flame is adjusted to produce maximum flame spread of 8-9 inches and 24 inches, respectively, after 4 minutes. When so tested the strips produced maximum flame spreads of from 15 to 17 inches to qualify as Class II rated fire retardants.

EXAMPLE 11

An additional number of strips produced in Example 10 having add-on values from 20 percent to 8 percent were subjected to weather testing according to a procedure similar to Underwriters' Laboratory Test 790, a standard test for weathering of roofing and siding material. The test consisted of alternate cycles of 96 hours water spray (0.7 inches/hour) followed by 72 hours drying at 60° C. After 4 weeks the panels are removed, dried and rehumidified at 50 percent relative humidity.

After subjection to the weathering test the strips were ignited according to the procedure of Example 10. The results of the tunnel test on these specimens showed a maximum flame spread of from 16.5 to 18 inches for all the strips. By comparison untreated wood strips failed the test.

What is claimed is:

1. A composition of matter comprising a cellulosic material rendered resistant to fire by addition thereto of a fire-retarding amount of one or more derivatives of polyphosphoric acid partial esters of the formula

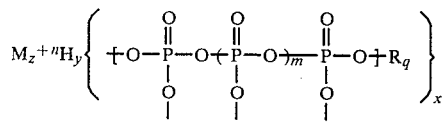

wherein,

R is each occurrence the remnant of phenol, halophenol or a $C_{1-20}$ aliphatic or halogenated aliphatic monohydroxyl compound formed by removal of the hydroxyl group;

M is independently each occurrence a cationic species selected from ammonium, substituted ammonium, and mono-, di-, tri- and tetravalent alkali metal, alkaline earth metal, transition metal and group 3a metal cations of the periodic table;

m is an integer from zero to three; y is an integer equal to or greater than zero; and q, x and z are all integers greater than or equal to one selected such that $(zn) + y = x(m+4-q)$ and $q \leq m+3$.

2. The composition of claim 1 wherein R is selected from $C_{1-20}$ alkyl, alkyl (poly)oxyalkyl, phenyl (poly)oxyalkyl and halogenated derivatives thereof.

3. The composition of claim 2 wherein R is each occurrence a (poly)glycol monoether remnant of the formula

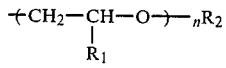

where $R_1$ is each occurrence hydrogen, methyl or halomethyl; $R_2$ is each occurrence $C_{1-6}$ alkyl or haloalkyl, phenyl or halophenyl; and n is an integer from 1 to 4.

4. The composition of claim 1, 2 or 3 wherein M is each occurrence ammonium, substituted ammonium, K, Mg, Al, Na, Ca, Ti, Cr, Mn, Fe, Cu, Zn or Ag.

5. The composition of claim 4 wherein the derivatives of polyphosphoric acid partial esters are substantially water-insoluble.

6. The composition of claim 5 wherein M is Al.

7. The composition of claim 1, 2 or 3 wherein m is zero, y is 2 and q is 2.

8. The composition of claim 5 wherein m is zero, y is 2 and q is 2.

9. The composition of claim 4 wherein one or more derivatives of polyphosphoric acid partial esters are added to the cellulosic material in an amount from about 1 to about 40 dry add-on percent.

10. The composition of claim 9 wherein one or more derivatives of polyphosphoric acid partial esters are added to the cellulosic material in an amount from about 5 to about 30 dry add-on percent.

11. The composition of claim 5 wherein one or more derivatives of polyphosphoric acid partial esters are added to the cellulosic material in an amount from about 1 to about 40 dry add-on percent.

12. The composition of claim 4 wherein the cellulosic material is wood.

13. The composition of claim 11 wherein the cellulosic material is wood.

14. In the process wherein a cellulosic material is treated with a fire-retarding amount of a fire-retarding composition in order to render the cellulosic material resistant to fire, the improvement comprising using as the fire-retarding composition one or more derivatives of the partial esters of polyphosphoric acids of the formula

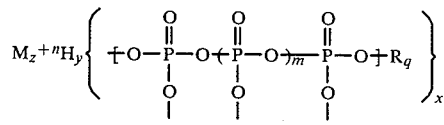

wherein,

R is each occurrence the remnant of phenol, halophenol or a $C_{1-20}$ aliphatic or halogenated aliphatic monohydroxyl compound formed by removal of the hydroxyl group;

M is independently each occurrence a cationic species selected from ammonium, substituted ammonium, and mono-, di-, tri- and tetravalent alkali metal, alkaline earth metal, transition metal and group 3a metal cations of the periodic table;

m is an integer from zero to three; y is an integer equal to or greater than zero; and q, x and z are all integers greater than or equal to one selected such that $(zn) + y = x(m+4-q)$ and $q \leq m+3$.

15. The improvement according to claim 14 wherein R is selected from $C_{1-20}$ alkyl, alkyl (poly)oxyalkyl, phenyl (poly)oxyalkyl and halogenated derivatives thereof.

16. The improvement according to claim 14 wherein R is each occurrence a (poly)glycol monoether remnant of the formula

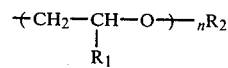

where $R_1$ is hydrogen, methyl or halomethyl; $R_2$ is $C_{1-6}$ alkyl or haloalkyl, phenyl, halophenyl or methylphenyl; and n is an integer from 1 to 4.

17. The improvement according to claim 14, 15 or 16 wherein the derivatives of polyphosphoric acid partial esters are substantially water-insoluble.

18. The improvement according to claim 17 wherein M is Al.

19. The improvement according to claim 18 wherein the cellulosic material is wood.

20. The improvement according to claim 17 wherein the cellulosic material is treated with the fire-retarding composition by contacting the cellulosic material with an organic solvent having dissolved therein one or more derivatives of the partial esters of polyphosphoric acids of the formula

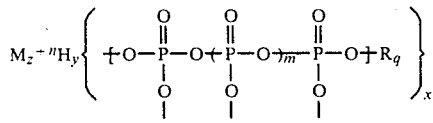

wherein,

R is each occurrence the remnant of phenol, halophenol or a $C_{1-20}$ aliphatic or halogenated aliphatic monohydroxyl compound formed by removal of the hydroxyl group;

M is independently each occurrence a cationic species selected from ammonium, substituted ammonium, and mono-, di-, tri- and tetravalent alkali metal, alkaline earth metal, transition metal and group 3a metal cations of the periodic table;

m is an integer from zero to three; y is an integer equal to or greater than zero; and q, x and z are all integers greater than or equal to one selected such that $(zn)+y=x(m+4-q)$ and $q \leq m+3$, and subsequently removing the organic solvent therefrom.

21. The improvement according to claim 20 wherein the fire-retarding amount of the fire-retarding composition is from about 1 to about 40 dry add-on percent.

22. The improvement according to claim 21 wherein the fire-retarding amount of the fire-retarding composition is from about 5 to about 30 dry add-on percent.

* * * * *